United States Patent [19]
Iadarola

[11] 3,736,058
[45] May 29, 1973

[54] ROTATING REFLECTOR LEVEL ROD

[76] Inventor: Joseph M. Iadarola, 3422 Oliver St., N.W., Washington, D.C. 20015

[22] Filed: Apr. 15, 1971

[21] Appl. No.: 134,352

[52] U.S. Cl. .......................... 356/4, 356/172, 33/293
[51] Int. Cl. ........................ G01c 3/08, G01b 11/26
[58] Field of Search ...................... 356/2, 3, 4, 5, 11, 356/17, 172, 249, 250, 255; 33/293

[56] References Cited

UNITED STATES PATENTS

| | | | |
|---|---|---|---|
| 3,588,249 | 6/1971 | Studebaker | 356/4 |
| 3,528,747 | 9/1970 | Walsh | 33/74 D |
| 3,588,255 | 6/1971 | Alexander | 356/172 |

*Primary Examiner*—Benjamin A. Borchelt
*Assistant Examiner*—S. C. Buczinski

[57] ABSTRACT

The present invention provides an apparatus and a related method of carrying out leveling survey operations (differential and trigonometric), and is distinguished more particularly by the application of a Rotating Reflector Level Rod which in conjunction with a laser distance measuring instrumentation combines the means of obtaining the required distance measurements to establish the elevations of remote ground points.

9 Claims, 19 Drawing Figures

FIG.1

INVENTOR
JOSEPH M. IADAROLA

INVENTOR
JOSEPH M. IADAROLA.

ROTATING REFLECTOR LEVEL ROD

Developments in electronic distance measuring instruments using laser beams have been continually evolving, one example being the feasibility of replacing the leveling survey telescope with a laser distance measuring instrumentation. Yet another step related to this developing process is the replacement of the conventional survey level rod with the Rotating Reflector Level Rod thus permitting the elevations of positions of great distances to be established. Upon further development of a combined "theodolite - laser distance measuring instrumentation," the Rotating Reflector Level Rod can also be utilized in trigonometric leveling to obtain the following data for determining differences of elevations: (a) reciprocal observations of vertical angles determined simultaneously from two triangulation stations, (b) horizontal distance between the stations, (c) the vertical distance of the "rotating reflector" above the ground marker.

Conventional methods frequently used in leveling surveys are carried out by means of differential or spirit leveling and trigonometric leveling.

Differential leveling is generally accomplished by using various types of telescopic instruments-such as Wye levels or Dumpy levels-for taking direct readings from level rods on which the graduations are marked in numerous patterns — either in feet or meters. The general features of a level instrument consist of a telescope that provides a line of sight and a spirit level attachment located on the underside of the telescope. The line of sight is in a horizontal position when the bubble is in the center of the spirit level tube. The level instrument is attached to an adjustable leveling head which in turn is screwed to a tripod.

To illustrate a general method of determining an elevation during the running of a line of levels, assume that the level instrument has been set up and leveled. The conventional practice is that a horizontal sighting is taken on a level rod held on a point of known elevation (EL = 100 ft.), called a bench mark. If the line of sight of the level instrument intersects the rod at a point 4 feet above the bench mark, the rod reading is 4 feet. Thus the elevation of the line of sight or the "height of instrument" (H.I.) is: 100 + 4 or 104 feet. Since the sighting to a rod held on a point of known elevation is identified as a "backsight" (B.S.), the equation is: EL + B.S. = H.I. The line of sight is then directed toward the level rod held over a point of unknown elevation; assuming the rod reading is 6 feet, the elevation of the unknown position is equal to 104 minus 6 feet or 98 feet. The sighting to a level rod held on a point of unknown elevation is called a "foresight" (F.S.) and the second equation is: H.I. − F.S. = EL. During these leveling operations the necessity of maintaining equal distances of the "backsights" and "foresights" is fundamentally important in order to reduce the effect of instrumental errors. The leveling survey continues in this manner until the final foresight is taken to complete the level circuit.

Trigonometric leveling generally serves to establish elevations of high positions whose location could not be connected suitably to a precise level line. In trigonometric leveling, the differences of elevation are determined mathematically from the vertical angles observed between two stations, and the horizontal or geodetic distances. Generally, two methods are used to determine the difference of elevation of two stations of known distance apart. The vertical angles determined at one station only, is known as the non-reciprocal observation method. The vertical angles determined from each station to the other is known as the method of reciprocal observations. The reciprocal observation method is preferred since it would tend to balance out the effects of the coefficient of refraction. To acheive the most favorable results the observations in both directions should be carried out simultaneously. However in triangulation activities where each station is occupied successively, the reciprocal observation method is usually carried out but the observations in both directions are not undertaken simultaneously.

In establishing a circuit of precise levels, definite procedures of observation must be consistently maintained in order to reduce errors to a minimum. The necessity to maintain equal distances (approximately 100 ft.) of backsights and foresights to reduce instrumental errors is a requirement of prime importance. This latter requirement imposes restrictinos which affect the course of a level line. Local circumstances quite often necessitate that level lines be planned to follow longer routes because intervening geographical features consititute obstacles that require extremely long sightings which are unsuitable. Geodetic leveling accuracy is seriously affected when leveling across wide, unbridged rivers. Neither could precise leveling be undertaken over considerably wide bays and channels, broadly separated islands, fjords, and ravines or where distances may reach several miles. Since many geographical conditions contribute significantly to alter the direction and increase the length of level lines, the effects on geodetic operations result in more extensive field activities and involve greater expense.

The general object of the present invention is to establish, economically and accurately, vertical control points (bench marks) directly across considerably wide gaps and also to extend elevation points into remote geographical areas which cannot be serviced by conventional leveling methods because of terrain conditions, limited length of sights, and atmospheric conditions. Remote areas that would be brought within the scope of this invention include localities where special data for geodetic research or engineering work are required and where the need to connect triangulation stations to an adjoining precise level line could be accomplished expeditiously and with comparatively high accuracy.

To accomplish the objectives of this invention a "Rotating Reflector Level Rod" apparatus is provided that will simultaneously, i.e., during single station set up, permit the desired horizontal and vertical distances to be recorded by laser beam distance measurement equipment during leveling operations. Furthermore, in triangulation activities, this apparatus can be placed on a triangulation tower platform; then by removing the bottom reflector and placing it on a ground marker directly beneath the "Rotating Reflector Level Rod" apparatus, a means will be devised that will produce:

a. Horizontal distance between stations.

b. Vertical distance between the horizontal line of laser beam and the ground marker — and consequently the elevation of ground marker.

c. Simultaneous determination of reciprocal vertical angles of each station from the other.

The instrument that will provide the required data consists of a structural framework — rectangular in shape and five sided — of standardized length which may vary in accordance to the user's requirement; the structural enclosure contains a Rotating Reflector arrangement mounted on a rotating axle; the rotating axle is in turn supported by a vertical sliding frame that is geared to move up or down in a channel-track cut into the rear surface of the structural enclosure; attached to the end of the rotating axle is a vertical circle arrangement for vertical angle readings; a slow motion mechanism is geared to the vertical circle vernier knob controlling the axle rotation; at the top of the structural enclsoure, a reflector is permanently fixed; at the bottom of the structural enclosure a relfector is mounted on a metal base plae which is inserted into slots to facilitate removal; the distance between the top relfector and bottom base plate is accurately standardized in order to provide an index for checking the observed vertical distance data; attachment lugs on the outer surface of the structural enclosure allow it to be secured in the center of a rotating mounting ring which also serves as a horizontal angle circle; the rotating mounting ring is geared to a tripod head which is further connected to adjustable tripod legs; the tripod legs are in turn secured to three extension arms located on a triangular shaped stabilizing base; the extension arms of the base are adjustable in order to help stabilize the structural enclosure; spirit levels are attached to the outside surface of the structure to effect proper leveling; at the center of the triangular base a rotating flange is set into a circular opening; in this rotating flange the bottom of the structural enclosure will rotate horizontally while resting on top of a station marker.

When the "Rotating Reflector Level Rod" is intended for use on an observation platform of a triangulation tower, the structural enclsoure is plumbed directly over the ground marker and then secured in the same manner as previously described; the removable base-plate and bottom reflector are taken from the structural enclosure and placed on top of the ground marker directly in line with the vertical axis of the "Rotating Reflector Level Rod."

The utilization of the Rotating Reflector Level Rod (RRLR) to obtain the required distance data, differs significantly from the conventional method of taking direct readings from a graduated level rod with a leveling instrument. To obtain the required vertical distance, the RRLR is erected over a permanent ground marker or Bench Mark whose elevation is to be determined. To accomplish this set up, the operator first places the center opening of the triangular shaped stabilizing base over the ground marker. The RRLR which is fastened to the tripod head is then pivoted over the ground marker through the rotating flange in the center opening of the stabilizing base, while the tripod legs are secured into the sockets of the base extension arms. To plumb the RRLR over the ground marker, the tripod legs are adjusted until the bubbles of the level tubes, attached to the sides of the RRLR, are centered. The RRLR is then rotated in the horizontal circles of the tripod head in the direction of the laser beam instrument. At this point the operator sets the rotating reflector in a vertical position by using the vertical angle circle attached to the axle of the reflector. When the reflector is set in this vertical position, the front plane of the reflector is directly in line over the center of the ground marker. The operator then moves the rotating mirror up or down the sliding channel track of the RRLR, until the laser beam is detected. Fine adjustments are then made until the laser beam is symmetrically centered on the graduated grid lines of the reflector and then recorded by the laser beam distance measuring equipment. The laser beam source may comprise, for example, a conventional laser distance measuring equipment such as the; AGA Geodimeter Model 8; currently manufactured by, AGA Geodimeter Co., Ligingo, Sweden.

Figure 16:
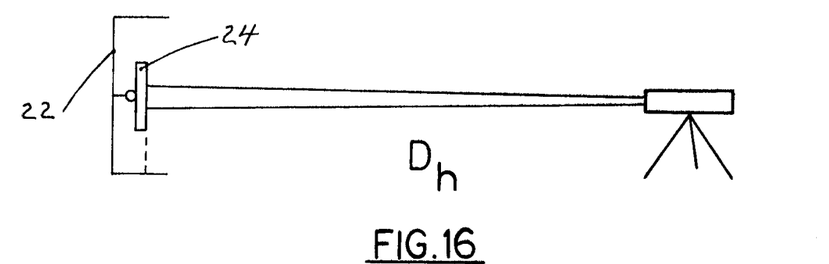
FIG. 16 is a schematic showing the system in position for measurement of horizontal distance, $D_H$.
Figure 17:
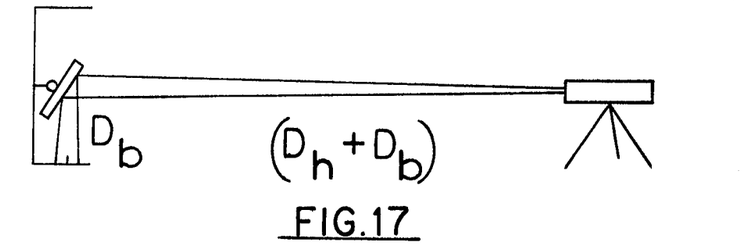
FIG. 17 is a schematic showing the system in position for measurement of the combined horizontal and vertical distance to the bottom reflector, $(D_h + D_b)$.

The first routine of the distance measurement operations should be devised to permit the horizontal distance $(D_H)$ to be recorded by the laser beam instrument (FIG. 16). During the next stage, the RRLR operator is instructed — by two-way radio — to rotate the reflector toward the base reflector until the laser beam is symmetrically centered on the base reflector grid and then reflected back to the laser beam instrument. This total distance recorded by the laser beam instrument includes both horizontal and vertical distance and may be denoted by the expression: $(D_h + D_b)$, where $D_h$ is the horizontal component and $D_b$ is the vertical component from the bottom reflector, (FIG.17). It may be generally stated at this point that aside from the relative importance of the treatment of errors, the vertical distance between the horizontal line of the laser beam and the ground marker is determined by $(D_h + D_b) - D_H = D_b$.

Figure 18:
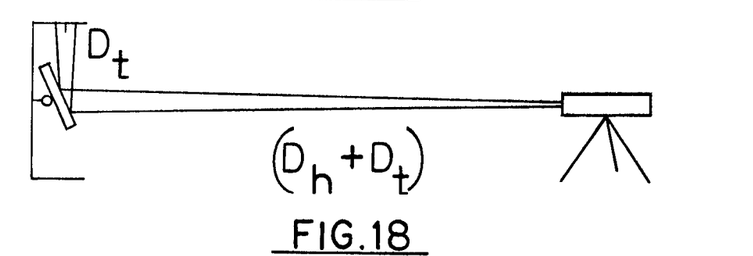
FIG. 18 is a schematic showing the system in position for measurement of the combined horizontal and vertical distance to the top reflector, $(D_h + D_t)$.
Figure 19:
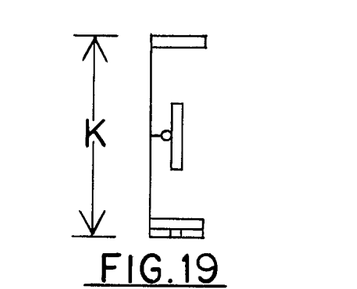
FIG. 19 is a schematic showing the standardized length $K$ of the Rotating Reflector Level Rod structure — which approximates the recorded distance data: $(D_b + D_t) = K$.

The operator is next instructed to rotate the reflector upward toward the top reflector until the laser beam is perpendicular or symmetrically centered on the relfector grid and then reflected back to the laser beam instrument. The total recorded distance consisting of the horizontal and vertical distances from the top reflector is denoted by: $(D_h + D_t)$, where $D_h$ is the horizontal component and $D_t$ is the vertical component from the top reflector, (FIG. 18). From this data recorded during this third stage, it may be stated that the vertical distance between the horizontal line of laser beam and the top reflector is: $(D_h + D_t) - D_H = D_t$. The total vertical distances recorded by the laser beam instrument is: $(D_b + D_t)$. Considering the mathematical treatment of various correction factors, the total vertical distance recorded by the laser distance measuring instrument may be compared with the standardized length $K$ of the RRLR, (FIG.19), whereby: $(D_b = D_t) = K$.

Assuming that the "height of the laser beam instrument," (H.I.) is known, [as previously described, the H.I. = elevation (EL) plus Backsight, (B.S.)] — , and the vertical distance $(D_b)$ determined from the RRLR is a foresight (F.S.), then the elevation of the ground point over which the RRLR is located would be: H.I. − F.S. = Elevation.

The following drawings illustrate the preferred embodiment of the invention.

Figure 1:
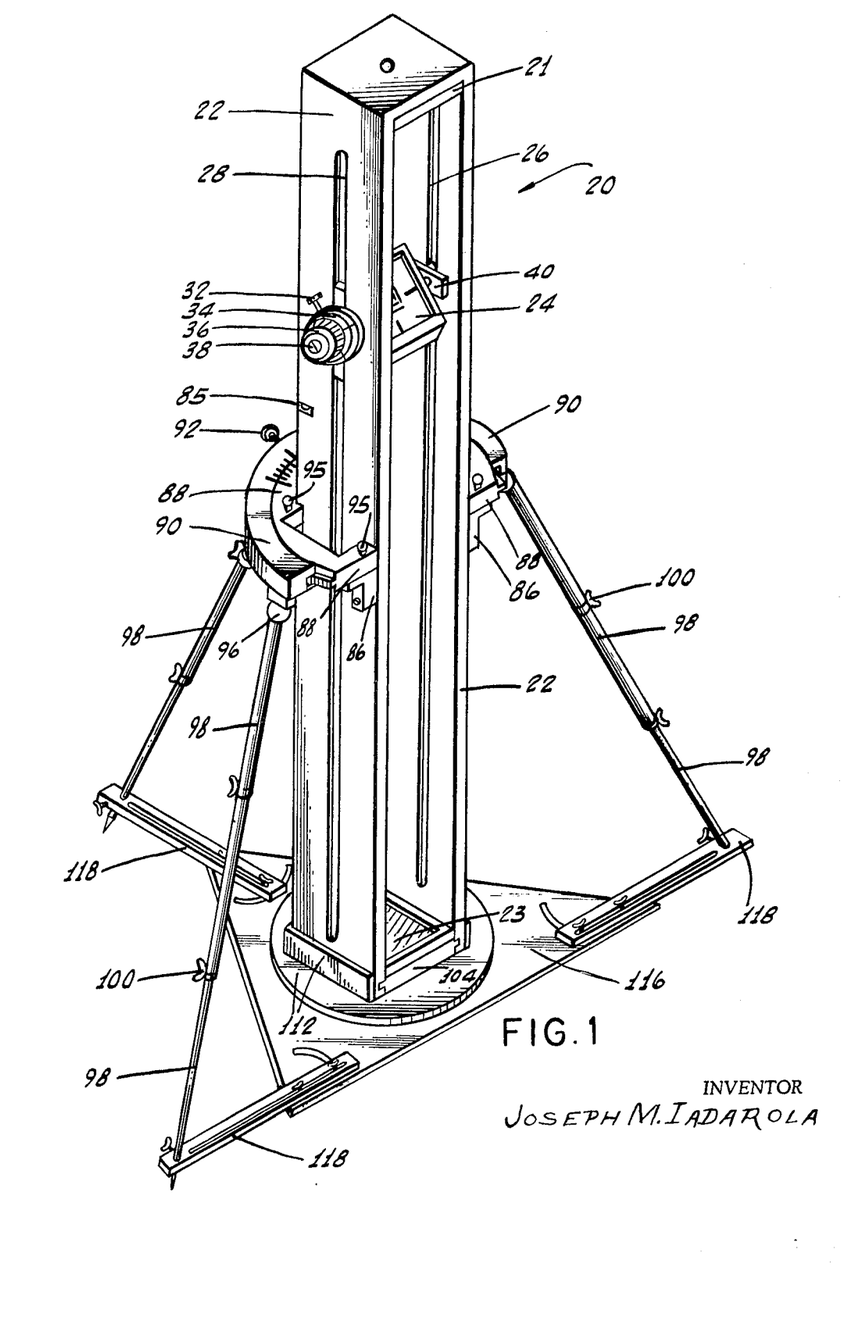
FIG. 1 is a perspective view of the Rotating Reflector Level Rod apparatus.
Figures 9, 10, 11:
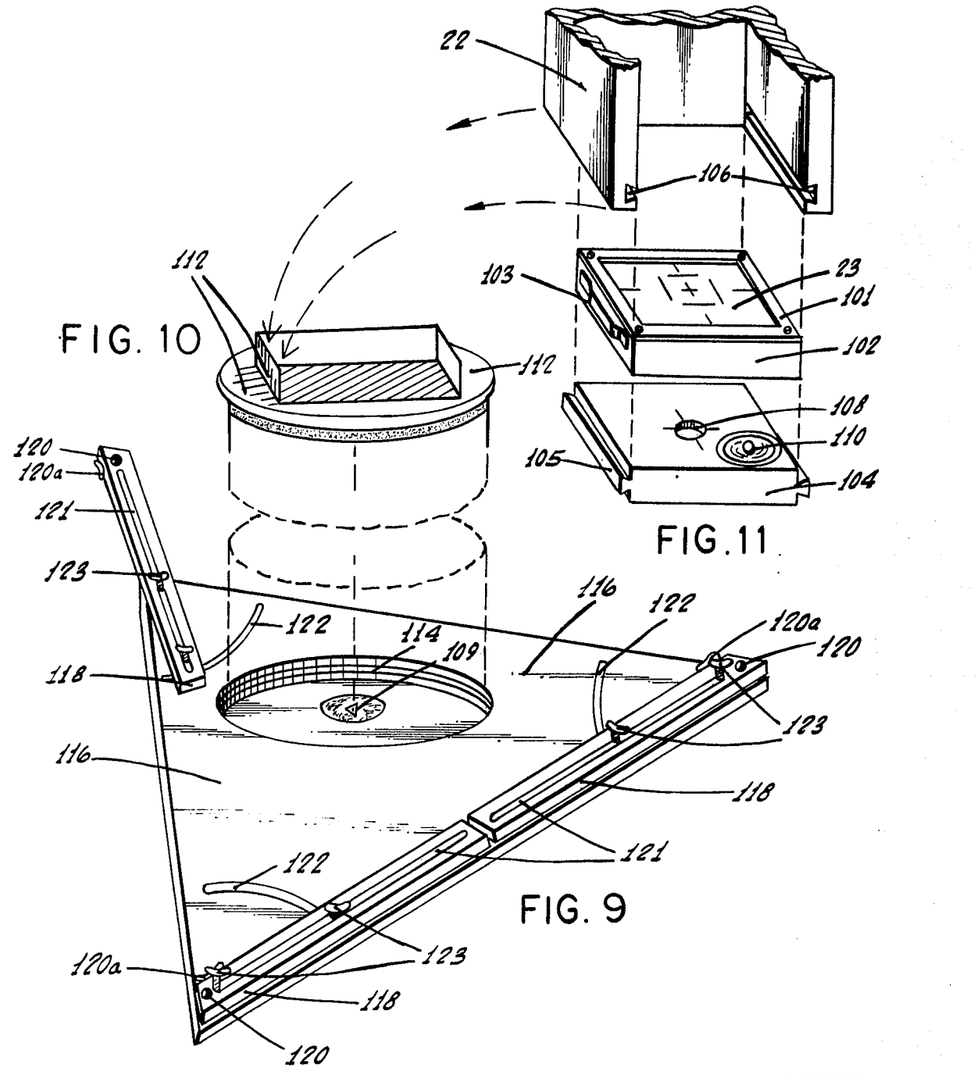
FIG. 9 is a perspective view of the tripod stabilizing base.
FIG. 10 is a perspective view of rotating flange which houses the Rotating Refelctor Level Rod structure.
FIG. 11 is an exploded perspective view of the combined bottom reflector and removable base plate with centering hole.
Figures 12, 15:
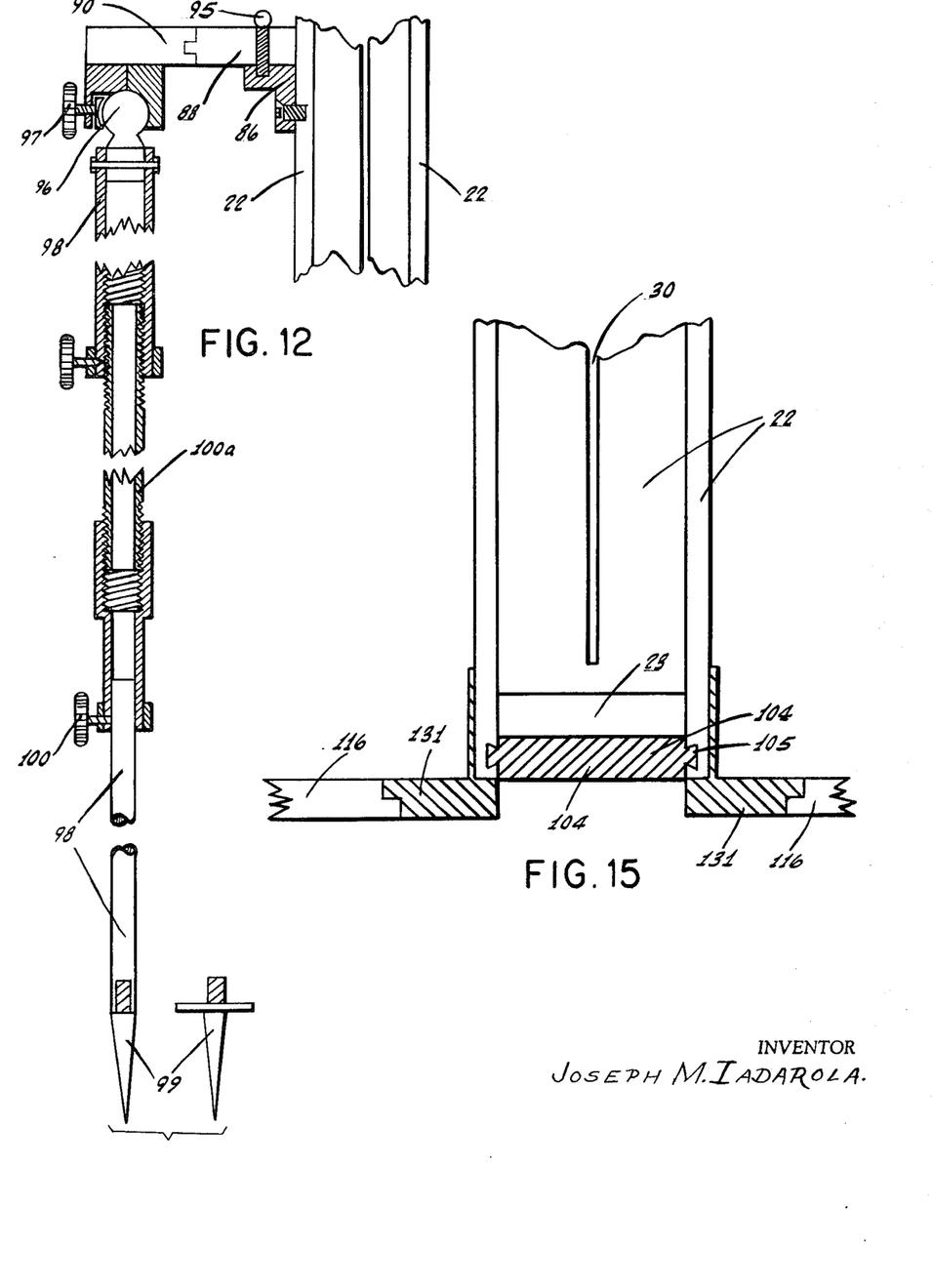
FIG. 12 is a front elevation plan showing ball joint assembly attached to tripod rotating head; and also showing fine adjustment screw on telescoping tripod legs.
FIG. 15 is a front elevation plan of a rotating flange for supporting the Rotating Reflector Level Rod structure when mounted on observation platform.
Figures 13, 14:
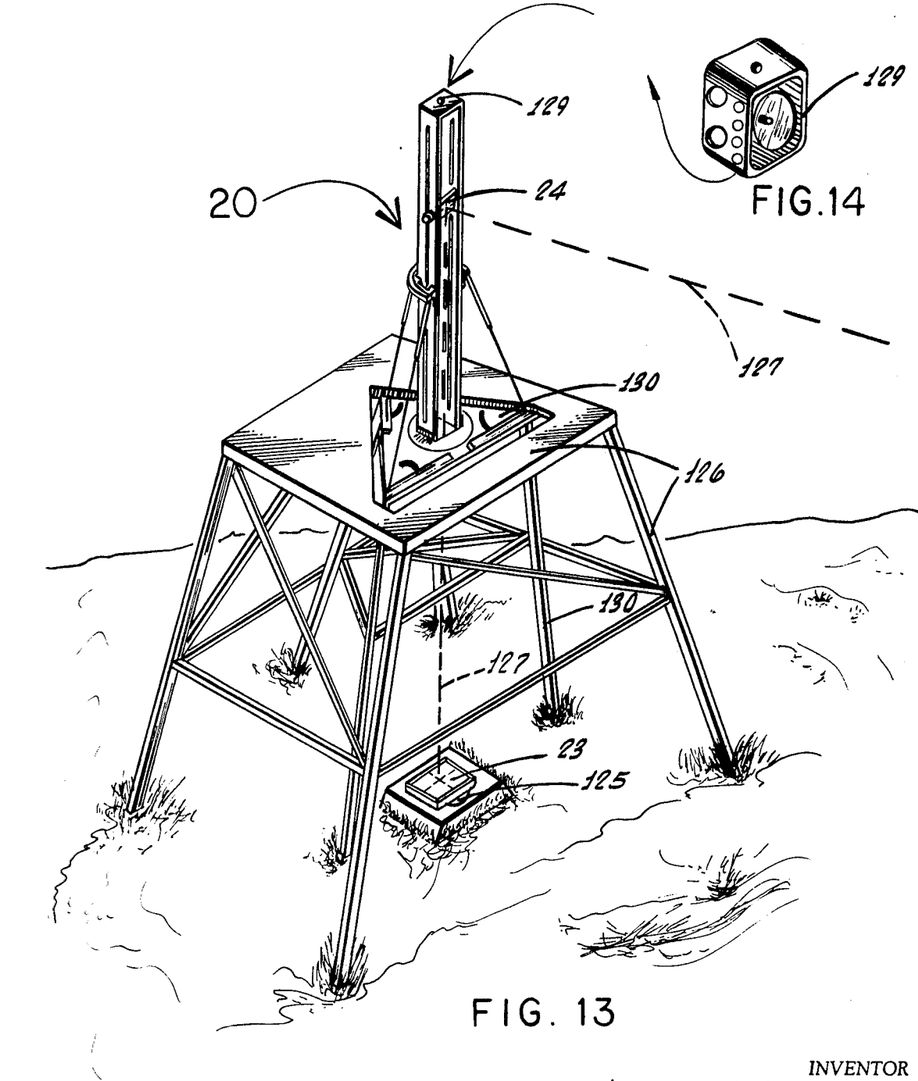
FIG. 13 is a perspective view of the Rotating Reflector Level Rod mounted on an observation platform showing the path of the laser beam being directed to the bottom reflector located on top of the ground marker.
FIG. 14 is a perspective view of a light signal beacon that is mounted on top of the level rod structure for use in horizontal angle observations.

The Rotating Reflector Level Rod apparatus 20, (FIG. 1), is comprised of six principal components, namely: a structural framework (rectangular in shape and five sided) of standardized length 22, (FIG. 1,2), a rotating reflector 24, (FIG. 1,5), the top reflector 21, (FIG. 1), and bottom reflector 23, (FIG. 1,11,13,15), centering base plate 104 (FIG. 1,11,15) and the vertical angle circle 34, (FIG. 1,2,3,6,7). To align the rotating reflector 24 with a laser beam, during a level survey, three general motions are essential, namely: a vertical or up and down motion, rotation in the vertical plane, and rotation in the horizontal plane.

Figure 2:
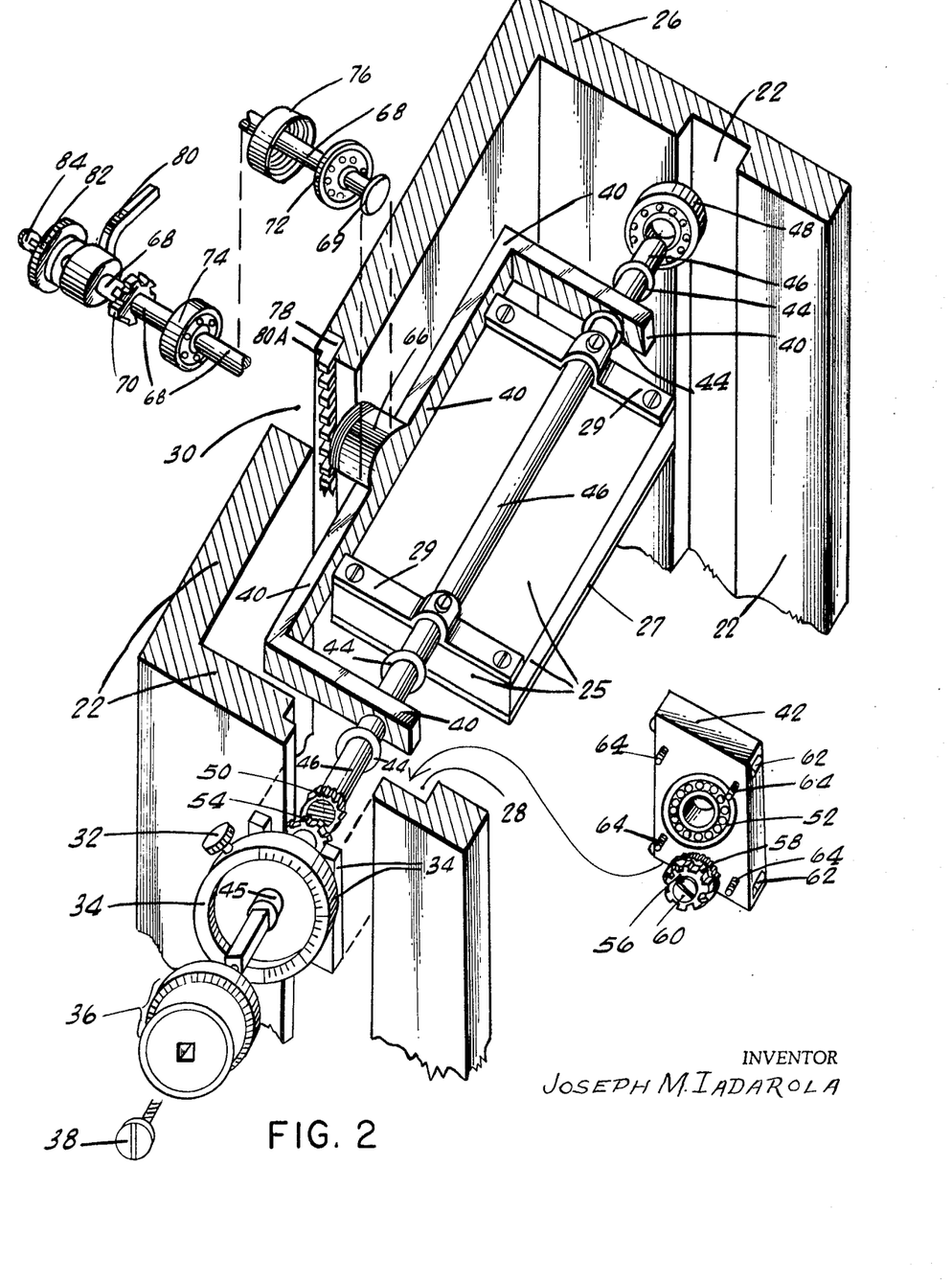
FIG. 2 is an exploded perspective view of the principal parts of the rotating reflector mechanism and vertical motion assembly.
Figures 3, 4, 5:
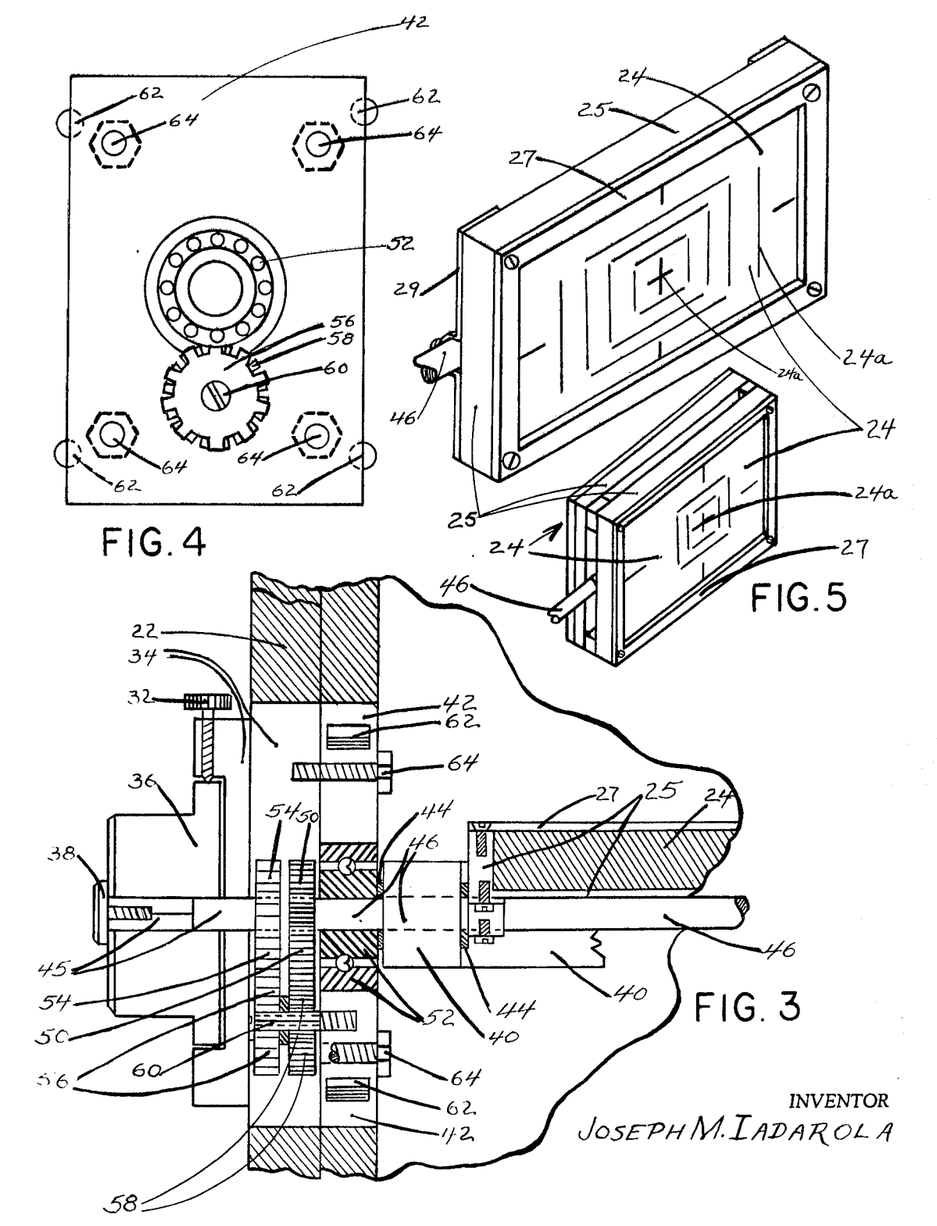
FIG. 3 is a front elevation plan of the rotating reflector mechanism with vertical angle circle.
FIG. 4 is a front elevation plan of vertical sliding stabilizer supporting rotating axle.
FIG. 5 is a perspective view of the single and double mounted rotating reflectors with laser beam centering grid.
Figure 6:
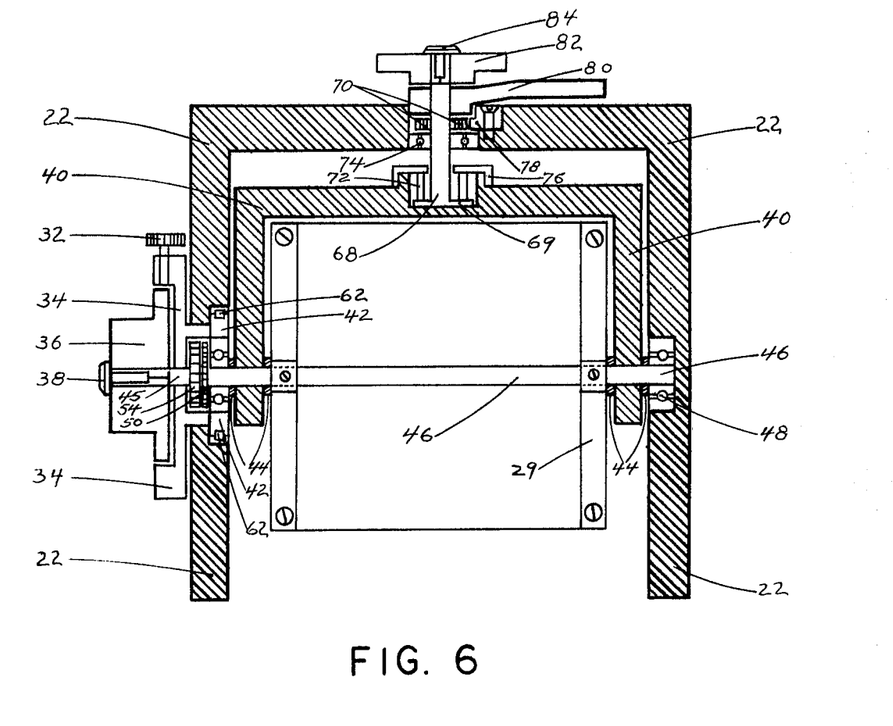
FIG. 6 is a top plan view of rotating reflector mechanism and vertical motion assembly.
Figure 7:
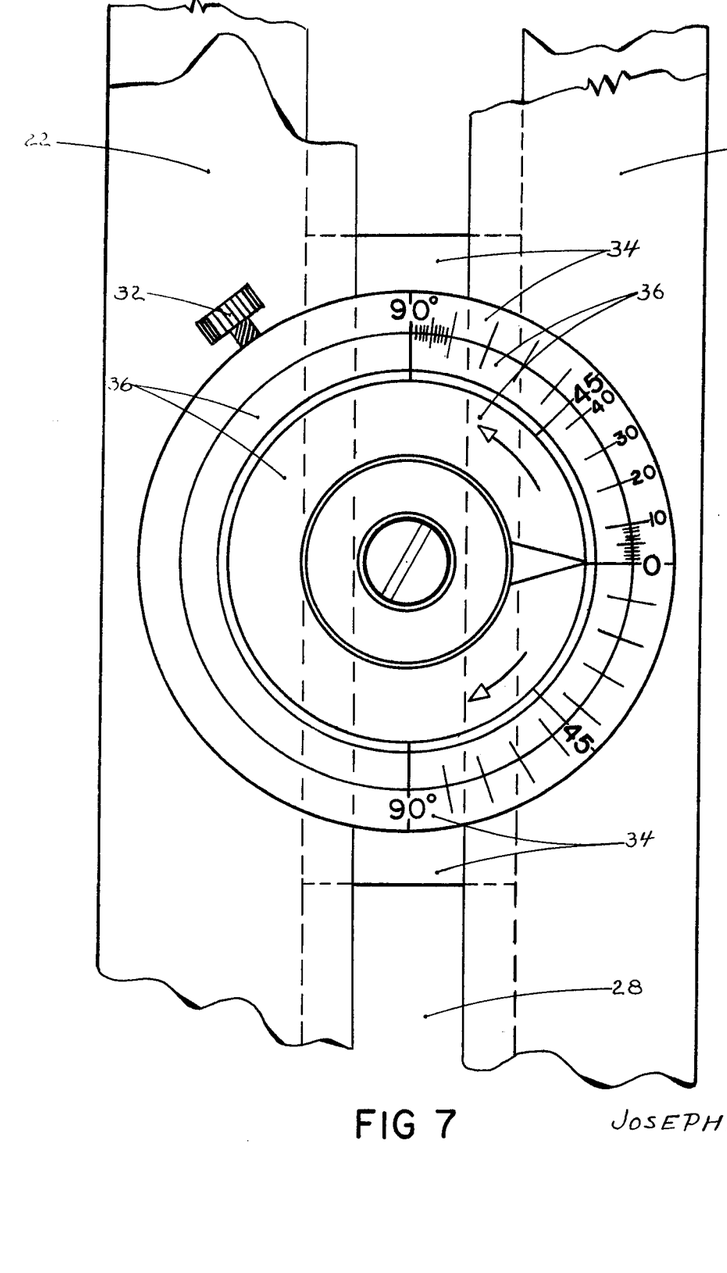
FIG. 7 is a side view plan of the vertical angle circle of rotating reflector including rotating knob and locking screw.

The vertical motion for laser beam alignment is accomplished by sliding the reflector supporting frame 40 up or down in the geared channel track 30, (FIG. 2). The components pertaining to supporting frame 40 consist of: a U-shaped frame 40 which support the rotating mirror axle 46 (FIG. 2); a roller bearing housing 66 which contains roller bearing 72 and axle boss 69 fixed to axle 68; lock nut 76 is screwed on to housing 66 to secure bearing 72 and axle boss 69; roller bearing 74 friction fitted to axle 68 rides in channel track 30; rotating gear 70 fitted to axle 68 engages rack gear 78 located in channel track 30; eccentric cam lock 80 which is rotatable about axle 68 locks rotating axle 68 in channel track at point 80a; rotating knob 82 mounted on axle 68 permits rotation of gear 70; locking screw 84 is tapped into the end of axle 68 to retain rotating knob 82.

To effect rotation in the vertical plane, the reflector 24 (FIG. 1,5) which is mounted on axle 46 is turned by rotating vernier-kob 36 (FIG. 2,3), through a system of reduction gears. The components pertaining to the rotating reflector 24 consist of: the reflector itself 24 which is inclosed in container 25 (FIG.2) and then secured in container 25 by a retaining frame 27; the container 25 is mounted on brackets 29 and fastened to rotating axle 46; rotating axle 46 revolves within the parallel sides of supporting frame 40; space washers 44 help stabilize the reflector container 25; the right end of rotating axle 46 is fitted into roller bearing 48 which in turn is housed in vertical channel 26; the left side of rotating axle 46 revolves in roller bearing 52 which is mounted into a vertical-slide stabilizer 42; the vertical-slide stabilizer 42, containing 2 roller bearings 62 (FIG. 2,3,4) on each vertical edge is mounted to move vertically in channel 28; the left end of rotating axle 46 is finally fitted into gear 50 (FIG.2,3) which meshes with reduction gear 58; gear 58 is connected to rotate simultaneously with reduction gear 56; gears 58 and 56 are both mounted on axle 60, (FIG.2,3); axle 60 is fixed into the vertical slide stabilizer 42; the vertical slide stabilizer 42 is attached to the vertical angle circle 34 by beams of 4 machine screws 64; thus the reduction gear 56 is driven by gear 54 which is mounted to rotate with the vernier axle 45; vernier axle 45 is supported by the fixed vertical angle circle 34 which is slidable between the edges of channel 28; the vernier axle 45 then extends beyond the fixed vertical angle circle 34 and set into the rotating vernier-knob 36; thus by rotating the vernier-knob 36 the rotating reflector 24 is made to revolve in the vertical plane; when the laser beam is symmetrically centered about the reflector grid lines 24a the rotating axle 46 is locked by the lock-screw 32 which is mounted through the fixed vertical angle circle 34.

Figure 8:
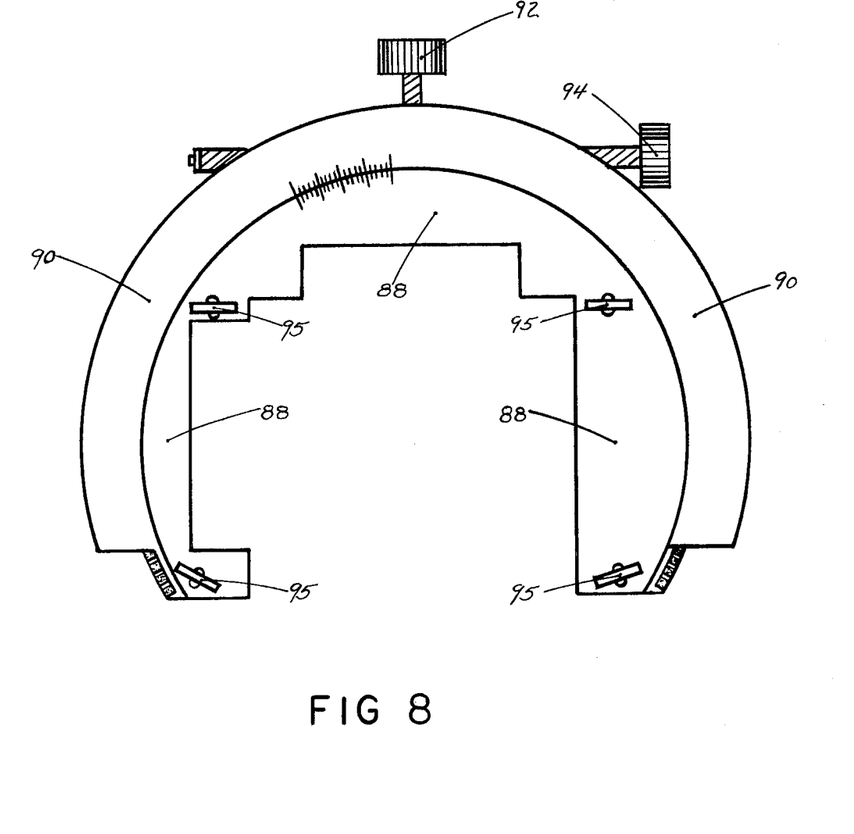
FIG. 8 is a top plan view of tripod rotating head.

Rotation in the horizontal plane is effected by turning the tangent screw 94 (FIG.8) which is geared to rotate the inner ring angle circle 88 of the tripod head 90. The overall horizontal rotation is accomplished as follows: The tripod stabilizing base 116 (FIG.9) is firmly positioned on the ground so that the ground marker 109 is located in the center of the circular base opening 114; the stabilizing base 116 is oriented so that one of its sides is approximately perpendicular to the direction of the laser beam; the tripod legs 98 (FIG.1,12) are then fitted into sockets 120 (FIG.9) located on extension arms 118 and then secured by thumb screws 120a; the extension arms 118 are adjustable through slots 121 and 122 in order to allow adjustments of the tripod legs 98; thumb screws 123 secure the extension arms 118 to the stabilizing base 116; the reflector enclosure 22 is mounted in the rotating sleeve 112 which is rotatable in the center opening 114 of the stabilizing base 116 while the enclosure base plate 104 (FIG.11) rests on the ground marker 109; the reflector enclosure is next fastened to the inner rotating ring 88 (FIG.1,8,12) by means of four attachment lugs 86 (FIG.1,12) and secured by four thumb screws 95; to assure further centering of the reflector enclosure 22 over the ground marker 109, the bottom mirror 23 (FIG.11) is removed and the centering may be checked through the center opening 108 in the enclosure base plate 103; while the reflector enclosure 22 is resting on the ground marker 109, leveling can be achieved by moving the enclosure 22 about the ball joints 96 (FIGS.1,12), when the level tubes 85 (FIG.1) located on the back and side of enclosure 22 indicate proper leveling the thumb screws 100 and 97 are secured; the bottom mirror 23 (FIG.11) is replaced and secured in place by tension spring 103 which is attached to mirror container 102; at this stage the entire reflector enclosure 22 is horizontally rotated by the inner ring 88 (FIGS.1,8) which is geared to be activated by the tangent screw 94; the rotating inner ring 88 is locked in position by the tangent lock screw 92 after the laser beam has been centered horizontally about the reflector grid lines 24a.

Having symmetrically centered the laser beam about the reflector grid 24a by means of the three described motions, the Rotation Reflector Level Rod system 20 is ready for the distance data to be recorded.

The Rotating Reflector Level Rod system can be erected on an observation tower 126 (FIG.13) and utilized as a target to obtain: (a) horizontal distance between two stations, (b) the vertical distance of the rotating reflector 24 above ground marker 125, (c) reciprocal vertical angle data, (d) horizontal angle observations. To obtain these data, the reflector enclosure structure 22 is mounted into the rotatable support-ing flange 131 (FIG.15) and then fixed to the tripod stabilizing base 116 which is attached to the observation platform 130 (FIG.13); the bottom mirror 23 is removed and the reflector structure 22 is leveled — as previously described — and also plumbed over the ground marker 125 by utilizing the center opening 108 (FIG.11) of base plate 104; after the reflector structure 22 is leveled and plumbed, the base plate 104 is removed along its slidable tongue and groove edges 105 and 106; the base plate 104 is then placed on ground marker 125 (FIG.13) and leveled by the circular bubble 110 (FIG.11) and afterwards the bottom reflector 23 is mounted on top of the base plate 104. The orientation motions of the reflector 24 and structure 22, (i.e., horizontal, vertical and rotation in vertical plane) necessary for centering the laser beam 127 (FIG.13) on the reflector grid 24a, (FIG.5) are accomplished in the same manner as previously described for the leveling survey; when the laser beam 127 is symmetrically centered about the reflector grid lines 24a, the reflected laser beam should be parallel to the incident beam; at this stage of operation the reciprocal vertical angle readings are indicated on the vertical angle circle and vernier 34 and 36; the reciprocal vertical angle readings taken from the reflector structure 22 may be checked (by radio communication) with the vertical angles observed at the other end of line as observed on the vertical circle of the laser-theodolite instrumentation; when the horizontal distance and vertical angles have been satisfactorily recorded during this first stage of operation, the operator is then directed to rotate the reflector 24 downward until the laser beam 127 is reflected back from the base reflector 23; the total distance recorded during this second operation represents — considering necessary correction factors — the horizontal distance between the two stations and the distance of the rotating reflector about the ground marker 125. With the data thus recorded the elevation of ground marker 125 can be computed trigonometrically.

The availability of a "laser-theodolite" instrumentation would also permit horizontal angles between stations to be observed during night operations by sighting to the light beacon target 129 (FIG.14) which is fitted into socket 128 located on top of the reflector structure 22.

To minimize the effect of instrumental and observational errors arising, for example, from the symmetrical collimation of the laser beam about the reflector grid, the utilization of double rotating reflectors 24 (FIG.5), would be more preferable for all observations. The use of rotating reflectors 24 being a different method of observation, various routines and programs of observations must be specially devised. For example, a special arrangement of vertical angle observations may consist of a series of repetitive rotations in a clockwise direction and then a series in a counter clockwise direction for each of the two reflectors. In general, this alternation method of observation could be combined with other observation routines that would sufficiently reduce to a minimum the effects of instrumental errors.

It will be understood by those skilled in the art that in this application there is shown and described only the preferred embodiment of the invention by disclosing merely the primary concept as contemplated in the use of the invention. However, it is further understood that the invention and its various related details are capable of many different embodiments and numerous modifications without departing from the scope of the invention. Accordingly, the foregoing drawings and descriptions are to be interpreted merely as illustrative in nature and not in a limiting sense.

Having thus described my invention, I claim:

1. Surveying apparatus for measuring vertical and horizontal distances — by using for instance a laser beam as the light source of electronic distance measuring equipment — comprising:

a structural framework of standardized length containing a rotating reflector mechanism, also including means for aligning said structure and reflector mechanism for impinging a laser beam symmetrically on said rotating reflector, and further including reflecting surfaces at top and bottom of said structure with means to re-direct said laser beam to electronic distance measuring equipment;

said rotating reflector mechanism comprising the combination of an arrangement of rotating reflectors to receive the projected laser beam with means to impinge said laser beam symmetrically about the center of said reflectors and that said reflectors are rotatably mounted with means to intercept, align, and direct the impinged laser beam both horizontally and either downward or upward to respectively fixed reflecting surfaces which are located at bottom and top of said structural framework, so that the said laser beam is in turn reflected back to the distance measuring equipment for determining the horizontal and vertical distances;

said rotating reflector comprising: an arrangement of a rotating axle mounted in a supporting frame which is geared to slide vertically in the channel tracks included in the said structural framework; said rotating axle is further geared—through a slow motion or gear reduction mechanism—to a vertical angle circle arrangement with means for vertical angle readings;

means for attaching, stabilizing, and rotating said structural framework in the center of a horizontally rotating mounting ring which is geared to a tripod head;

a ground support base with means to stabilize, support, and secure the said structural framework and said adjustable tripod while resting the said structure on top of a station marker; said ground support base includes a horizontally rotating flange in which said structural framework is rotated about a vertical axis for intercepting said laser beam.

2. Apparatus of claim 1 and comprising reflectors located at top and bottom of structural framework; said bottom reflector is mounted on a base plate which is inserted into slots to facilitate removal; the distance between the top reflector and bottom base plate is accurately calibrated in order to provide an index for checking the observed vertical distance data.

3. Apparatus as defined in claim 1 in which said structural framework — when utilized on observation towers — includes means for removing base plate and bottom reflector so that said base plate and reflector may be placed on ground point directly in line with said structural framework in order to provide means for reflecting the laser beam as projected from the rotating reflector of said structure.

4. The apparatus of claim 1 plus means for connecting a light beacon at top of structural framework which would permit horizontal angles-between observation towers erected over triangulation stations-to be observed during night operations by sighting said light beacons with "laser-theodolite" equipment.

5. A method for determing elevations, utilizing a laser distance measuring source is comprised of the following steps;

impinging a laser beam about the center of a rotating reflector, the distance between said center and the source of said laser beam being designated $D_h$, rotating said rotating reflector so as to reflect said impinged beam symmetrically centered on a base reflector, said distance between the center of the reflector and the source of laser beam plus the distance between said center of the reflector and the base reflector being measured as ($D_h + D_b$), determining said elevation of the center of said rotating reflector above said base reflector being calculated by subtracting $D_h$ from ($D_h + D_b$), determining the accuracy of said measurements being determined by impinging said laser beam upwardly to a top reflector, the distance between the center of said rotating reflector and the top reflector plus the distance between the center of said rotating reflector and said laser beam source being measured as ($D_h + D_t$), determining the distance between the center of rotating reflector and said top reflector being calculated by subtracting $D_h$ from ($D_h + D_t$), determining the accuracy of the elevational measurements $D_b$ and $D_t$ being determined by comparing said reading for $D_b$ and $D_t$ against the physical measurement ($K$) of the apparatus which includes the bottom and top reflectors.

6. Apparatus for measuring horizontal and vertical distance comprising:

a source comprising a laser beam, a rotatable reflector impinged by said laser beam, a bottom reflector mounted below said rotatable reflector, a top reflector mounted above said rotatable reflector, means for moving said rotating reflector vertically between said bottom and top reflectors, means at said laser beam source for sensing the reflected laser beam to give a measurement of the distance between the laser beam source and said rotating reflector apparatus.

7. An apparatus as in claim 1, wherein said arrangement of rotating reflector comprises one reflector.

8. An apparatus as in claim 1, wherein said arrangement of rotating reflector comprises a multiple of reflectors.

9. An apparatus as in claim 1, wherein said means to impinge said laser beam symmetrical about the center of said reflectors comprises gauge marks.

* * * * *

UNITED STATES PATENT OFFICE
CERTIFICATE OF CORRECTION

Patent No. 3,736,058        Dated  29 May 1973

Inventor(s) JOSEPH M. IADAROLA

It is certified that error appears in the above-identified patent and that said Letters Patent are hereby corrected as shown below:

Column 5, Line 8.   Rotating Reflector Level Rod structure:

Column 6, Line 3.   rotating vernier knob 36 - - - -

Signed and sealed this 1st day of October 1974.

(SEAL)
Attest:

McCOY M. GIBSON JR.
Attesting Officer

C. MARSHALL DANN
Commissioner of Patents